(12) United States Patent
Umeda (10) Patent No.: US 11,913,615 B2
(45) Date of Patent: Feb. 27, 2024

(54) LED LIGHTING DEVICE

(71) Applicant: NIFCO INC., Yokosuka (JP)

(72) Inventor: Kenji Umeda, Yokosuka (JP)

(73) Assignee: NIFCO INC., Yokosuka (JP)

( * ) Notice: Subject to any disclaimer, the term of this patent is extended or adjusted under 35 U.S.C. 154(b) by 4 days.

(21) Appl. No.: 17/782,844

(22) PCT Filed: Jan. 8, 2021

(86) PCT No.: PCT/JP2021/000474
§ 371 (c)(1),
(2) Date: Jun. 6, 2022

(87) PCT Pub. No.: WO2021/149513
PCT Pub. Date: Jul. 29, 2021

(65) Prior Publication Data
US 2023/0003353 A1 Jan. 5, 2023

(30) Foreign Application Priority Data
Jan. 22, 2020 (JP) ................................ 2020-008489

(51) Int. Cl.
*F21S 41/141* (2018.01)
*F21S 41/20* (2018.01)
(Continued)

(52) U.S. Cl.
CPC ........... *F21S 41/141* (2018.01); *F21S 41/285* (2018.01); *F21S 43/195* (2018.01); *F21S 43/247* (2018.01); *F21S 43/27* (2018.01); *F21W 2102/00* (2018.01)

(58) Field of Classification Search
CPC .. B60Q 3/78; B60Q 3/62; F21S 41/141; F21S 41/285; F21S 43/195; F21S 43/247; F21S 43/236
See application file for complete search history.

(56) References Cited

U.S. PATENT DOCUMENTS 8,063,757 B2 * 11/2011 Frey ....................... B60Q 1/543
340/455
9,862,306 B2 * 1/2018 Yajima ................. B60Q 1/0047
(Continued)

FOREIGN PATENT DOCUMENTS

CN 106870975 A 6/2017
JP 2000-149608 A 5/2000
(Continued)

OTHER PUBLICATIONS

PCT/ISA/210, "International Search Report for PCT International Application No. PCT/JP2021/000474," dated Feb. 22, 2021.
(Continued)

*Primary Examiner* — Matthew J. Peerce
(74) *Attorney, Agent, or Firm* — Manabu Kanesaka (57) ABSTRACT

An LED lighting device includes a transparent cover member arranged at an exterior member or an interior member and covering an LED element and a light emitting surface of the LED element mounted on a substrate, and a light transmission member receiving emission light from the light emitting surface of the LED element at a light inlet end and operating as a light transmission path. The light transmission member is integrated with the LED element mounted on the substrate together with the cover member using a transparent resin by insertion molding.

7 Claims, 12 Drawing Sheets

(51) Int. Cl.
*F21S 43/19* (2018.01)
*F21S 43/247* (2018.01)
*F21S 43/27* (2018.01)
*F21W 102/00* (2018.01)

(56) References Cited

U.S. PATENT DOCUMENTS

| | | | |
|---|---|---|---|
| 10,247,873 B2* | 4/2019 | Min | F21S 43/247 |
| 2005/0270794 A1* | 12/2005 | Okamoto | F21V 5/008 |
| | | | 362/555 |
| 2006/0060867 A1 | 3/2006 | Suehiro | |
| 2009/0154182 A1 | 6/2009 | Veenstra et al. | |
| 2010/0246198 A1 | 9/2010 | Hook et al. | |
| 2011/0222310 A1 | 9/2011 | Parker | |
| 2013/0107557 A1 | 5/2013 | Dingman et al. | |
| 2017/0040496 A1 | 2/2017 | Martin | |
| 2017/0276318 A1 | 9/2017 | Pan et al. | |
| 2019/0217772 A1 | 7/2019 | Ueno et al. | |

FOREIGN PATENT DOCUMENTS

| | | |
|---|---|---|
| JP | 2006-108640 A | 4/2006 |
| JP | 2009-023247 A | 2/2009 |
| JP | 4772541 B2 | 9/2011 |
| JP | 2018-043744 A | 3/2018 |
| JP | 3215198 U | 3/2018 |
| WO | 2014/207635 A1 | 12/2014 |

OTHER PUBLICATIONS

European Patent Office, "Extended European Search Report with Search Opinion for European Application No. 21744027.0," dated Aug. 28, 2023.

* cited by examiner

LED LIGHTING DEVICE

TECHNICAL FIELD

The present invention relates to an LED lighting device.

BACKGROUND OF THE ART

Figure 11:
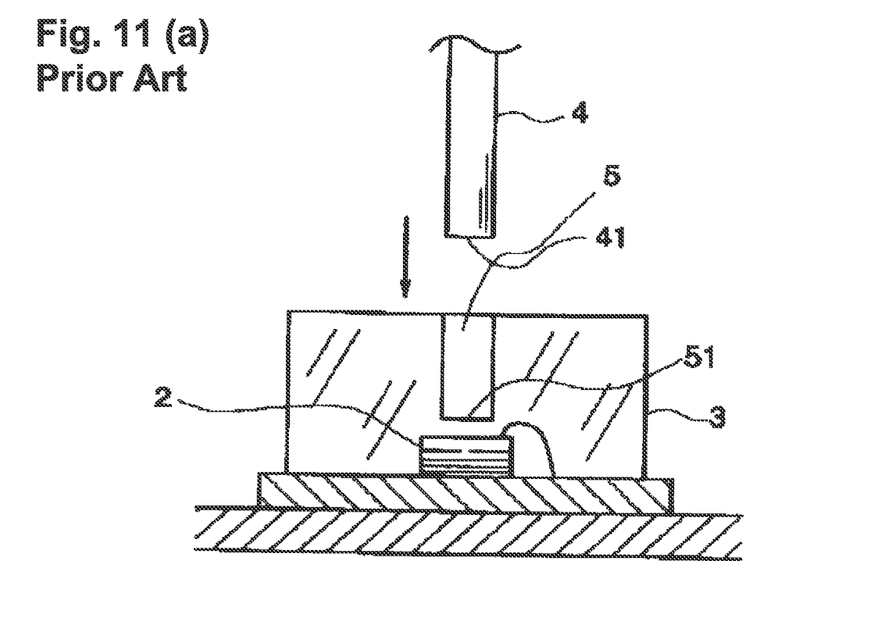
FIGS. 11(a) and 11(b) show a lighting device (FIGS. 3 and 4 of the Patent Document 1) disclosed in the Patent Document 1.

FIGS. 11(a) and 11(b) show an LED lighting device disclosed in Patent Document 1. The structure of the device comprises a transparent LED element 2 mounted on a substrate (printing substrate) and a cover member (transparent member) 3 covering a light emitting surface of the LED element 2, a fiber insertion hole 5 provided in the cover member 3 and positioned immediately above a light emitting surface of the LED element, and an optical fiber 4, wherein light illuminated from the light emitting surface of the LED element is led from a light emitting end located on an opposite side of the light introducing end 41 of the optical fiber 4 to use lighting. Here, the fiber insertion hole 5 is formed substantially perpendicularly to the light emitting surface of the LED element, and includes a bottom face 51, wherein the optical fiber 4 is inserted into the fiber insertion hole and fixed by glue. The optical fiber 4 is a general type, such as plastic or glass and so on, and it is possible to transfer light within a predetermined angle (such as 60 degrees) relative to a fiber axis in the light introduced into the light introducing end 41.

Figure 12:
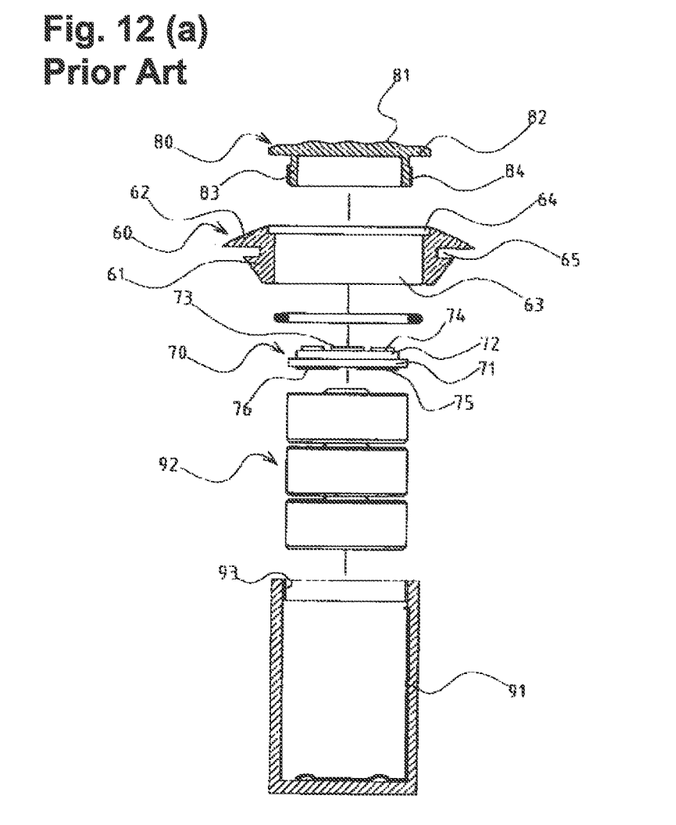
FIGS. 12(a) and 12(b) show a hole cap (FIGS. 3 and 6 of the Patent Document 2) disclosed in the Patent Document 2.

Also, FIGS. 12(a) and 12(b) show a hole cap disclosed in Patent Document 2. The hole cap detachably and attachable closes a service hole for maintenance (hereinafter attachment hole) attached to a door A of a vehicle, as shown in FIG. 12(b). A cap structure comprises a light emitting unit 70 having a light emitting element 74 which is an LED element mounted on a substrate 71, a housing 91 housing the light emitting unit 70 together with power source 92, a receiving portion 60 mounted at an upper end of the housing 91 and having an insertion portion 61 for inserting to the attachment hole, and an upper lid 80 with a lens 81 for closing an upper opening of the receiving portion 60. Also, the receiving portion 60 includes an annular groove 65 formed at the insertion portion 61, and is mounted to the attachment hole provided on a panel of a door A such that a hole edge is engaged with the annular groove 65.

PRIOR ART REFERENCES

Patent Document

Patent Document 1: Japanese Patent Publication No. 2000-149608
Patent Document 2: Japanese Utility Model Registration No. 3215198

SUMMARY OF THE INVENTION

Problem to be Solved by the Invention

In the LED lighting device as shown in FIGS. 11(a) and 11(b), the fiber insertion hole 5 is formed in advance in the cover member 3 covering the LED element 2, so that the optical fiber 4 can be easily and accurately attached. However, in this structure, it requires an assembly step where the optical fiber 4 is fixed to the insertion hole 5 of the cover member 3 by the glue AT to thereby increase the cost, and in addition, even if the optical fiber 4 is inserted to the insertion hole 5 and is fixed by the glue AT, the depth of the fiber insertion hole 5 is limited to have a chance of disengaging therefrom, to be unreliable. Also, in the structure, the structure is large due to the cover member 3 for fixing the optical fiber to thereby lower the free mounting of the structure, and since the existing optical fiber is used in the premise, the size (light amount) and the length according to the requirement cannot be selected, to thereby lower the free designing. Further, in this structure, there is a gap between the light emitting surface of the LED element 2 and the light introducing end 41 of the optical fiber 5, so that light taking-out efficiency is low, and heat radiation ability of the LED element is low.

In the hole cap of FIGS. 12(a) and 12(b), by adding the lighting ability, it can increase the safety such that when the light emitting unit 70 notices the opening condition of the door A, light is emitted to notice the opening condition of the vehicle to a car or a person coming from rear, to improve the safety. However, the structure requires a housing 91, the receiving portion 60 for the panel attachment, an upper cover 80 and so on in addition to the light emitting unit 70, so that the structure is complicated and expensive.

The object of the invention is to eliminate the problems stated above, and to provide an LED lighting device without assembly, with small size, easy designing, and high light taking-out efficiency to add additional value. Other objects of the invention will be apparent from the following description of the invention.

Means for Solving the Problems

In order to achieve the above objects, an LED lighting device according to one aspect of the invention comprises a transparent cover member arranged at an exterior member or an interior member and covering an LED element and a light emitting surface of the LED element mounted on a substrate, and a light transmission member receiving emission light from the light emitting surface of the LED element at a light inlet end and operating as a light transmission path, wherein the light transmission member is integrated with the LED element mounted on the substrate together with the cover member using a transparent resin by insertion molding.

In the LED lighting device in the aspect, "the LED element mounted on the substrate" is called an LED chip or LED structure, and it is not limited to a product sold in a market and is made as an exclusive product having the cover member and the light transmission member. The "light transmission member" is a transparent resin and is made integrally with the cover member, and is a member operating as a light transmission element which receives emission light from the light emitting surface of the LED element at a light introducing end and leads the light toward a light emission side at the opposite side of the light introducing end. Also, "together with the cover member" is used to mean substantially the same as "the light transmission member and the cover member."

The LED lighting device in the aspect is preferably made as the following aspects.
 (a) The cover member covers, together with the light emitting surface of the LED element, the substrate from an upper surface to a periphery and further a lower side thereof except for a power supply portion. In this structure, the cover member substantially covers the entire portion of the substrate including the light emitting surface except for the power supply portion. According to the structure, it provides the excellent water proof and dust proof, and in addition, connection of the light transmission member integrated with the cover member becomes strong, so that it is possible to eliminate a situation that the light transmission member is accidentally removed.

(b) The light transmission member is formed in an elongated shape or a convex shape. In this structure, in case the light transmission member is formed in an elongated shape, as a light emission aspect, it is possible to form a new type utilizing the light transmission member, and in case the light transmission member is formed with the convex shape, it is good as a point lighting device.

(c) The light transmission member has flexibility. In this structure, it is possible to arrange according a shape of a member to be attached, and freedom of the arrangement can be enlarged.

(d) The cover member and the light transmission member are formed of a polyolefin type polymer. In this structure, it is possible to provide excellent characteristics superior in heat resistance and high transparency and optical characteristics. As a polyolefin type polymer, polycarbonate, acryl, polyamide, polyurethane and so on are exemplified. More preferably, cycloolefin polymer (COP) and the similar resin excellent in heat resistance and high transparency in addition to optical characteristics are preferred.

(e) The light transmission member is arranged at an energy supply port, which is a power supply port or a fuel supply port provided at a vehicle exterior portion. This structure specifies a structure of the first embodiment explained later. According to the structure, it is possible to arrange the best lighting aspect according to the shape of the power supply opening, and to provide the excellent illuminating effect and novelty. But, in the lighting device, the device may be sufficient to adapt to the vehicle exterior member or interior member, and it is preferable, for example, for a head light, fog light, combination lamp, winker light and interior light.

(f) The cover member is integrated with an insertion portion inserted into an attachment hole provided in a body panel or door panel, and an engaging portion to prevent extraction of the insertion portion from the attachment hole. This structure specifies the structure of the second embodiment explained later. According to the structure, a number of parts is minimized, and an additional value can be easily added.

(g) The structure also serves as a hole cap or a hole plug which is attachably or detachably mounted to the attachment hole. According to the structure, a light and small device is realized, and a product value is improved. Incidentally, the hole cap is used as a name in the Patent Document 1, and the hole plug is used in the Publication No. 2012-72896.

Advantages of the Invention

The LED lighting device of the invention has the following advantages as the LED lighting device suitably arranged in the exterior portion or interior portion of a vehicle.

First, since the light transmission member forming the LED lighting device is integrated together with the cover member covering the light emitting surface, by the insert molding, to the LED element mounted on the substrate, i.e. the LED structure, by using a transparent resin, an attachment work of the light transmission member is not required. Thus, miniaturization can be easily made, and it has a structure excellent in water proof and dust proof effect to the LED element.

Second, since the light transmission member is integrated together with the cover member covering the light emitting surface of the LED element to the LED structure mounted on the substrate by the insert molding, there is no gap between the light emitting surface of the LED element and the light transmission member. Thus, light taking-out effect can be improved.

Third, limitation to an installation is eliminated by miniaturization, and a shape of the light transmission member is set desirably according to a using portion which is a counterpart. Thus, design freedom can be enlarged.

BRIEF DESCRIPTION OF THE DRAWINGS

FIGS. 3(a), 3(b) and 3(c) show an LED element mounted on a substrate forming the LED lighting device (hereinafter called an LED structure), wherein

FIGS. 6(a), 6(b) and 6(c) show an example where the LED lighting device is arranged in an electric supply portion of a vehicle, wherein

BEST MODE OF IMPLEMENTATION OF THE INVENTION

Hereinafter, characteristics of an LED lighting device of the invention is explained with reference to the drawings. In the explanation, the first embodiment of the LED lighting device and its modified examples 1 and 2, and the second embodiment and its modified examples are clarified together with the operations.

Figure 2:
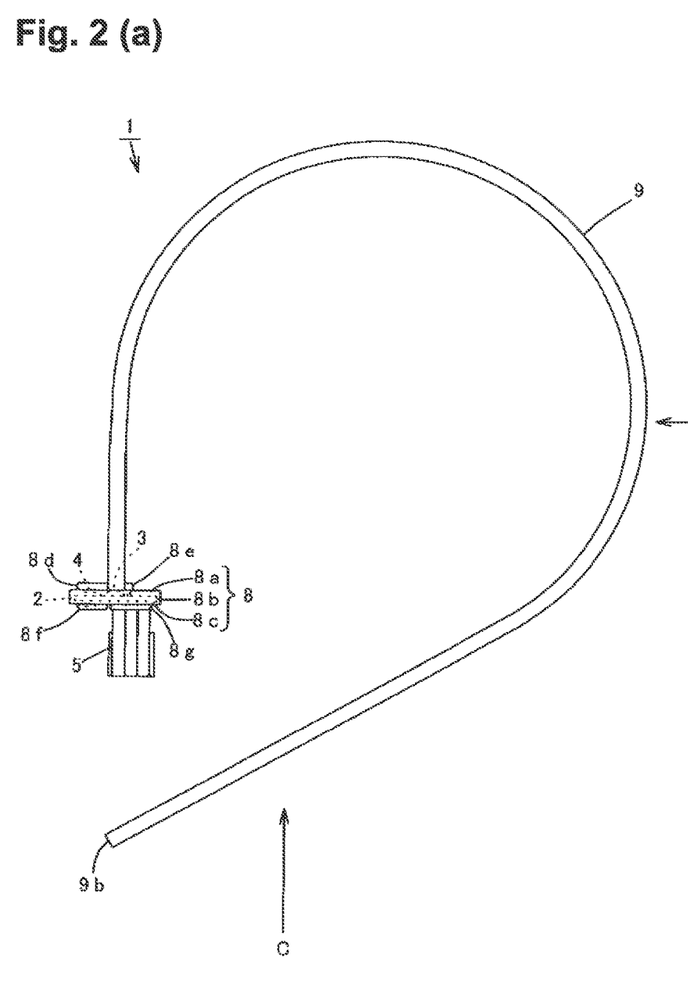
FIG. 2(a) is a schematic plan view of the above LED lighting device.
FIGS. 2(b) and 2(c) are schematic views of the device (a) from a B direction and a C direction shown in FIG. 2(a).

(First embodiment) The LED lighting device 1 of the first embodiment is the same as the Patent Document 1 in that the device comprises, as shown in FIGS. 2(a) to 2(c), a transparent cover member 8 covering an LED element 3 mounted on a substrate 2 and a light emitting surface of the LED element 3, and a light transmission member 9 operating as a light transmit path where emitted light from the light emitting surface of the LED element 3 is introduced from a light introducing end. The improved point is best specified as an exterior portion and an interior portion of the vehicle as the development goal of the LED lighting device 1, and resides in that the light transmission member 9 is integrally formed with the LED element 3 mounted on the substrate by using a transparent resin same as the cover member 8, namely formed by an insert molding in a state that the LED structure is arranged in the insert molding 30 as shown in FIGS. 4 and 5.

Figure 3:
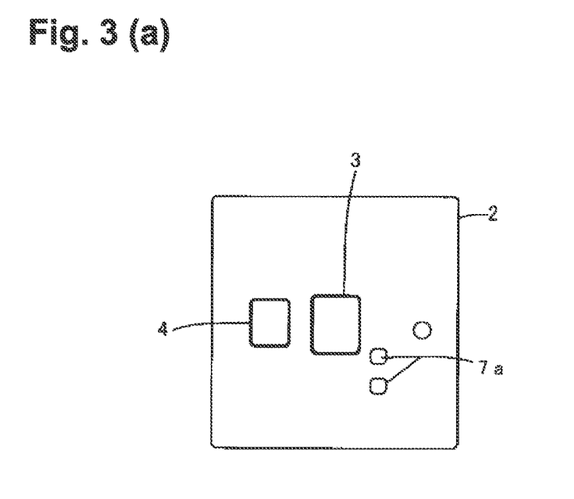
FIG. 3(a) is a plan view.
FIG. 3(b) is a front view and FIG. 3(c) is a bottom view.

Here, "the LED element 3 mounted on the substrate 2" is call an LED structure as required. The LED structure includes, as shown in FIGS. 3(a) to 3(c), the substrate 2 in a rectangular shape formed of ceramics and so on, the LED element 3 as an lighting element and a resistor 4 mounted on an upper surface of the substrate 2, and a connector 5 and so on integrally mounted under the substrate. The substrate 2 is printed with a wiring pattern, not shown, wherein the LED element 3 and the resister 4 are mounted on the fixed positions of the wiring pattern. The LED element 3 is a light emitting element called as a front mounting type. Numeral SD in FIG. 3(c) is a solder for fixing the resister 4. The connector 5 includes a pair of power supply pins 7, 7 in the form of pins mounted through an insulating material 6 in a holder, and outer power is supplies through the power supply pins 7. Then, the LED element 3 emits light with a voltage supplied through the resister 4. Numeral 7a in FIG. 3(a) is an end of the power supply pin projecting on an upper surface of the substrate.

Figure 4:
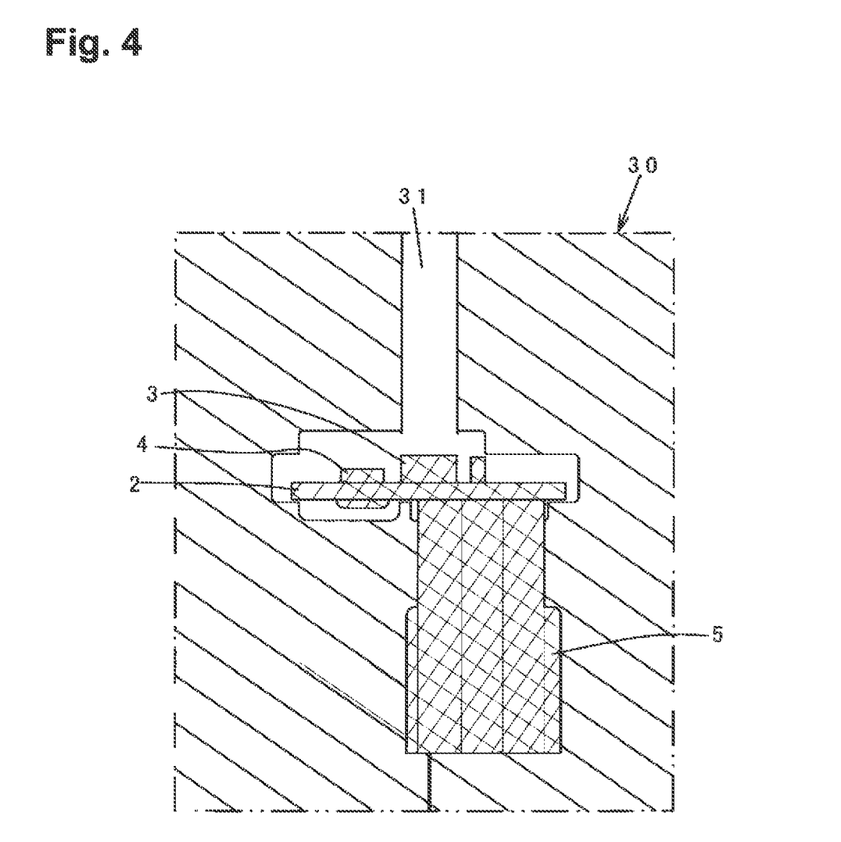
FIG. 4 is a partial schematic view showing a state wherein the LED structure is arranged in an injection mold.
Figure 5:
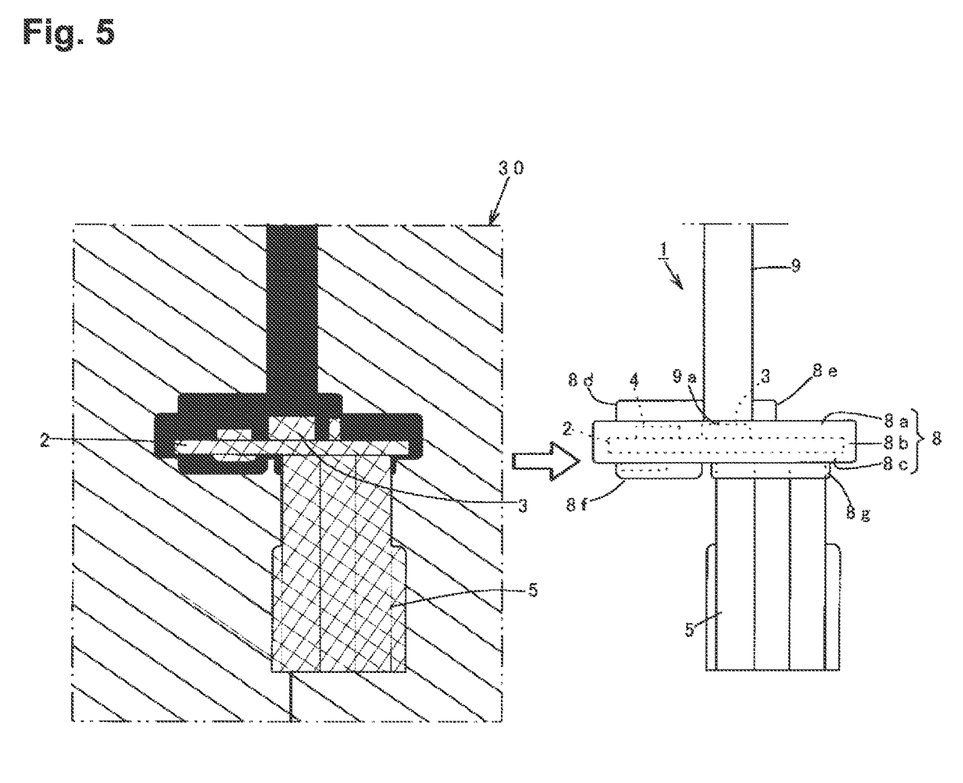
FIG. 5 is a schematic view showing a state wherein a molten resin is injected to a cavity of the injection mold, and a schematic view showing a state wherein the LED lighting device is removed from the mold after injection.

FIGS. 4 and 5 schematically show part of injection mold 30 forming an injection molding machine integrally molding the LED structure by an insert molding of the cover member 8 and the light transmission member 9. The injection mold 30 is formed of a plurality of divided molds, and divides and forms an insertion space for inserting the LED structure and an injection space corresponding to the cover member 8 and the light transmission member 9, namely a cavity 31. And, in a state that the LED structure is inserted into the insertion space, the cavity 31 is high pressure injected with a molten transparent resin from a nozzle, not shown, of the injection molding machine through a spool and so on. On the left side of FIG. 5, the transparent resin injected is shown with black for easy understanding. Thereafter, the injection molded article becomes, by releasing, the LED lighting device, as shown in the right side of FIG. 5, where the LED structure is integrated with the cover member 8 and the light transmission member 9.

The resin to be used is, among thermoplastic resins, as cycloolefin type polymer, especially, polyolefin type polymer (COP) and a similar resin. In the COP, cycloolefin units join randomly or alternately with polymer skeletons, and polymer is amorphous. As the material characteristics, it shows excellent high optical transparency, heat resistance, low shrinkability, low hygroscopicity, and flexibility. In this example, the cover member 8 and the light transmission member 9 are formed using COP in the name of ZEONOR (registered trademark) of Nihon Zeon Co., Ltd.

Figure 1:
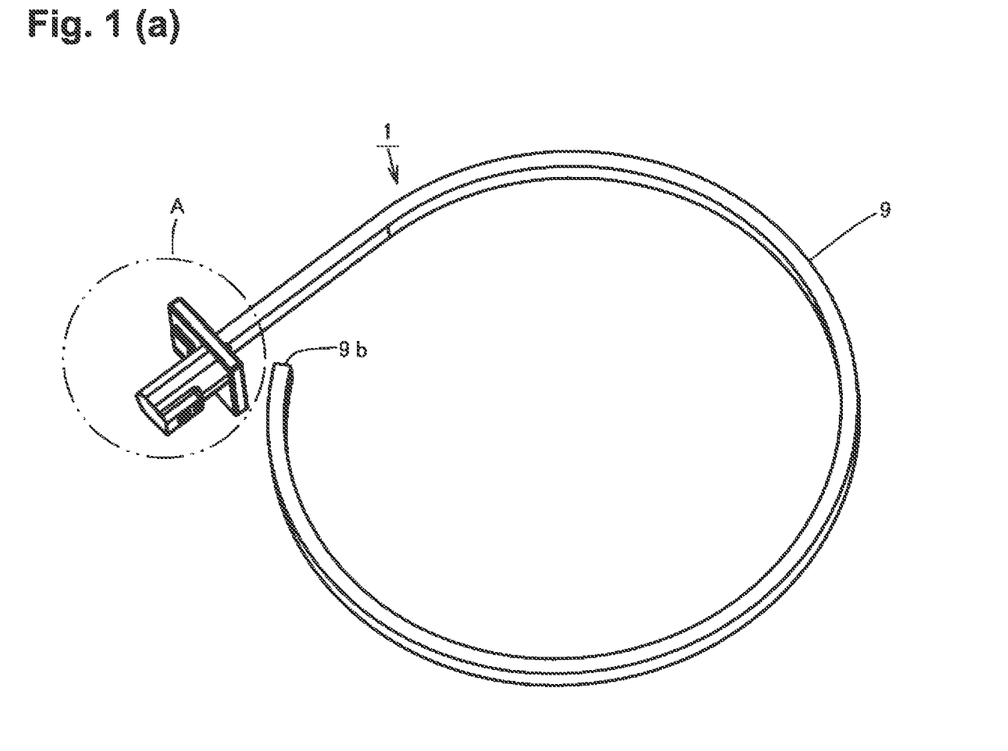
FIG. 1(a) is a schematic outside view of an LED lighting device of a first embodiment of the invention.
FIG. 1(b) is an enlarged view of an A portion shown by two dot lines in FIG. 1(a).

As shown in FIG. 1(b) and the right side of FIG. 5, the cover member 8 covers, together with the light emitting surface of the LED element 3, an upper face of the substrate 2 to a side and a lower side, except for the electricity supply portion. Numeral 8a is an upper side cover member coving the upper side of the substrate 2, numeral 8b is a side cover member covering a surrounding area of the substrate 2, and 8c is a lower side cover member covering a lower side of the substrate 2. Numerals 8d and 8e are protruding portions due to existence of the resistance 4 and a base end 7a of the electricity pin, numeral 8f is, in the lower covering portion, a protruding portion due to existence of the solder SD to fix the resistance 4 to the substrate 2, and numeral 8g is a cover portion covering the lower side of the connector 5.

The light transmission member 9 has a long shape, in the upper side cover member 8a, extending in an elongated condition in a state integrally joined at a portion covering the light emitting surface in the LED element 3. Also, the light transmission member 9 is rectangle in a section, and has flexibility formed as a whole in a ring shape. And, in the light transmission member 9, a portion covering the light emitting surface of the LED element 3 is a light introducing end 9a, an end on the opposite side is a light emitting end 9b, and a portion between the both ends 9a, 9b introducing the emitted light from the light emitting surface of the LED element 3 and leading the light to the light emitting end 9b becomes a light transfer path. In this example, as explained later, the light transmission member 9 makes the shape of the light transmission member clearly recognized, such as a ring shape, not a spot, due to radiance of the light transfer path transferring the emitted light of the LED element 3.

Figure 6:
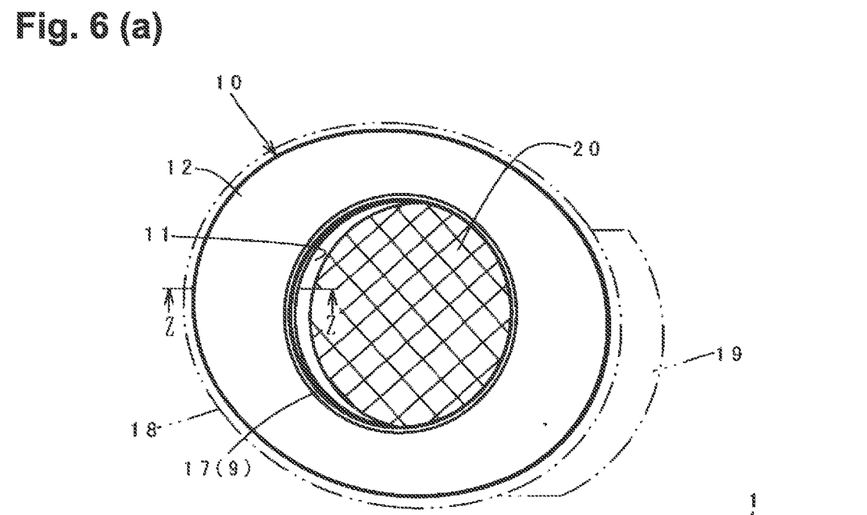
FIG. 6(a) is a schematic view in a state where a charging portion on a body side is exposed.
FIG. 6(b) is a schematic view seen from a back side of a case where the LED lighting device is removed.
FIG. 6(c) is a partially enlarged sectional view taken along a Z-Z line in FIG. 6(a).

Here, FIGS. 6(a) to 6(c) show an example using the LED lighting device. In the example, the LED lighting device 1 is used at an energy supply port 10 which is an power supply port provided in a vehicle. The energy supply port 10 is provided, shown in simple, at a concave portion opened and closed by a lid, not shown, formed at a rear wall of a body of the electric vehicle which is an exterior of the vehicle. In the concave portion, a charging port 20 of a connector for electric charge contacted by a charging gun on the electric supply side is arranged to be exposed. The case 11 includes a cover 18 rotated around a hinge 19, wherein the charging port 20 is exposed in the open condition of the cover 18, and closed in the closed condition of the cover 18.

Incidentally, this kind of structure is disclosed in, for example, Japanese Patent Publication No. 2012-226873. However, the publication has a structure, wherein a light source illuminating the charging port 20 is arranged at an outside of the charging port, and illuminates through a through hole provided on a hinge base portion side of the cover or an engaging portion side for engaging or disengaging the cover, so that for example, when a charging operation is made at a dark condition, the charging gun cannot be accurately and promptly contacted to the charging port. The LED lighting device 1 of the embodiment is best for the structure solving the above problem.

Namely, a case 11 shown in FIGS. 6(a) to 6(c) is provided with a flange 12 projecting at an upper edge, and includes a transparent portion 17 formed in a ring shape on an inner peripheral side relative to the flange 12, a vertical wall 13 projecting at the flange rear face and defining a groove portion 15 with respect to a surrounding wall of the case 11, a plurality of engaging portions 13a provided at a low end of the vertical wall 13 and supporting slipping of the light transmission member 9 arranged in the groove portion 15, and a frame portion 16 provided on one end side of the vertical wall 13 and attaching the substrate 2 and the connector 5 forming the LED lighting device 1. The transparent portion 17 is formed, for example, when forming the case 11 by an injection molding, by two color molding as a wall portion with transparent or milky color. Numeral 14 is a positioning shaft 14 projecting from the flange rear face.

And, in this structure, in the LED lighting device 1, a substrate 2 side and the connector 5 are engaged with the flame portion 16, and the light transmission member 9 is engaged and held relative to the groove portion 15 through the engaging portion 13a. In the holding condition of FIG. 6(c), when the LED lighting device 1 is supplied with power from a stabilizing device through the respective power supply pins 7 and the resister 4, the LED element 3 illuminates by the voltage thereof. In this structure, emitted light from the light emitting surface of the LED element 3 is introduced from the light introducing end 9a, advances through the light transmission member 9 as the light transfer path, and arrives at the light emitting end 9b to be emitted outside. For this reason, as the case 10 defining the energy supply portion, the light transmission member 9 is illuminated as the light transfer path, and the light thereof makes the outline of the charging part 20 to recognize through the transparent and milky wall portion which is the transparent portion 17, so that the charging gun at the power supply device side can be quickly and accurately connected to the charging port 20.

(Operation) Next, the main operation or advantages of the above LED lighting device are clarified. First, since the light emitting surface of the LED element 3 is covered by the cover member 8, and the light transmission member 9 is integrally formed with the cover member 8, an assembly work of the light transmission member 9 to the conventional LED structure is skipped, and the advantages of excellent water proof and dust proof are obtained. Also, since the light transmission member 9 is integrally formed with the cover member 8 covering substantially the entire part of the substrate 2, connecting condition with the cover member can be stably maintained. These advantages prevent accidental failure in advance in case the LED lighting device 1 is used in exterior as well as interior, so that quality and reliability are improved.

Also, since the light transmission member 9 is long and has flexibility, as shown in the using example shown in FIGS. 6(a)-6(c), it is possible to arrange according to a shape of a portion to be attached, so that the arrangement thereof is enlarged. Specifically, as the LED lighting device 1, the light transmission member 9 illuminates the outline in the ring shape, not a spot, through the transparent portion 17 as shown in FIGS. 6(a) to 6(c) by the brightness of the light transfer path transferring the emitted light of the LED element 3, so that, for example, the charging gun can be surely and accurately connected to the charging part 20.

Figure 7:
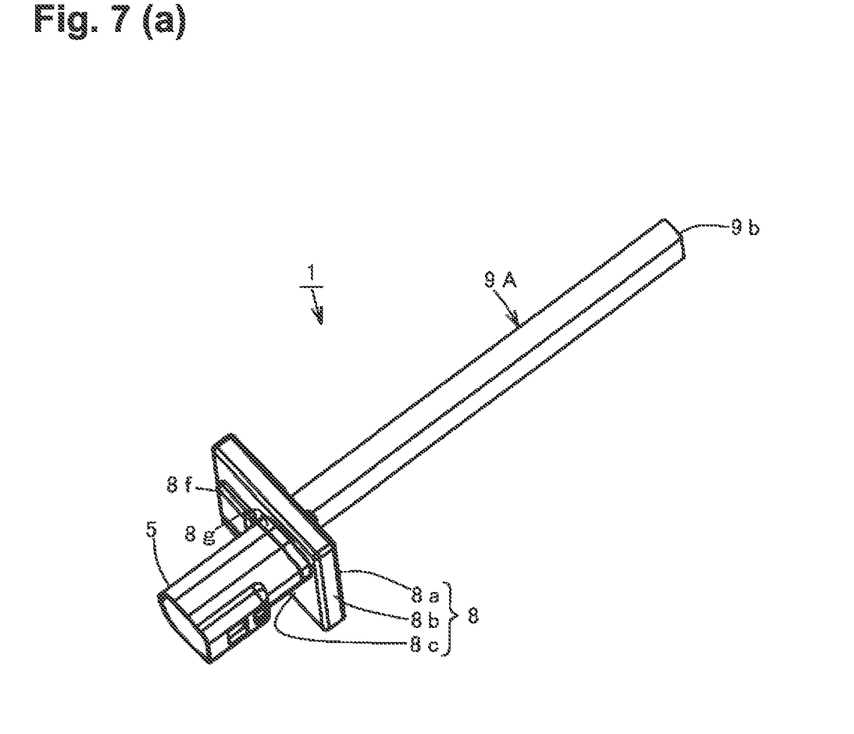
FIGS. 7(a) and 7(b) are schematic outside views of modified examples 1 and 2, wherein a shape of a light leading device of the LED lighting device is changed.

(Two modified examples of the first embodiment) FIGS. 7(a) and 7(b) show modified examples 1 and 2 where the shapes of the light transfer member forming the above LED lighting device are changed. In the explanation, members and portions same as the above embodiment are assigned with the same numerals to eliminate double explanation, and changing portions are only explained.

A light transmission member 9A in FIG. 7(a) is formed in a straight stick shape with a rectangular cross section. On the other hand, a light transmission member 9B in FIG. 7(b) is formed to be curved in an L-shape at the front side with a rectangular cross section. These devices are supposed to be attached to an exterior of a vehicle, for a light of a winker, a light of a door mirror, a light inside a bonnet or passenger compartment. The shape of the light transmission member 9 can be made other than this, and can be designed as desired according to an object to be used and a portion to be arranged.

(Second embodiment) The LED lighting device 1A of the second embodiment of the invention has, as shown in FIGS. 8(a) to 9(c), a structure also serves as a hole cap or a hole plug, which is attachable or detachable relative to an attachment hole provide in a vehicle body or a panel 25 of a door. Incidentally, in this explanation, members and portions same as the above embodiment are assigned with the same numerals to eliminate double explanation as much as possible.

Namely, the LED lighting device 1A is provided with a transparent cover member 8A covering the LED element 3 mounted on the substrate 2 and the light emitting surface of the LED element 3, and a light transmission member 9A receiving the emitted light from the light emitting surface of the LED element 3 and ejecting from the light emitting end. Also, the cover member 8A is integrally formed with an insertion portion 8h to be inserted to the attachment hole 25a of the panel 25, an engaging claw 8i which is an engaging portion to prevent pulling of the insertion portion 8h from the attachment hole 25a, and a flange 8j.

Here, the cover member 8A, as shown in FIG. 9(b), covers the light emitting surface of the LED element 3, a periphery from a top surface of the substrate 2 and a lower side except the power supply portion, and in addition, integrally formed with the insertion portion 8h with the engaging claw 8i and the flange 8j. Numeral 8a is an upper cover member covering an upper side of the substrate 2, numeral 8b is a peripheral cover member covering a periphery of the substrate 2, and numeral 8c is a lower cover member covering a lower side of the substrate 2. An upper end side of the connector 5 is varied in the lower cover member 8c. Namely, the connector 5 is provided to stand on the substrate 2 in a state that the upper end side is covered with the lower cover member 8c. An insulation member 6 inside the connector 5 and the power supply pins are omitted in the drawings.

The insertion portion 8h projects, in a state integrally connected with the lower cover member 8c, generally in a cylindrical shape with a bottom to have a predetermined distance S1 with the cover member 8A. The flange 8j is integrated in an umbrella shape at a tip of the periphery of the insertion portion 8h. The flange 8j elastically pressure contacts the upper face of the panel 25 when an insertion portion 8h is inserted into the attachment hole 25a, and in the pressure contact state, an excess insertion amount of the insertion portion 8h relative to the insertion hole 25a is regulated, and invasion of liquid and so on from the attachment hole 25a is prevented. The engaging claw 8i projects on the outer periphery of the insertion portion 8h. As shown in FIG. 9c, the engaging claw 8i changes with a reduction of a diameter in a course of inserting the insertion portion 8h into the attachment hole 25a, and when passing the attachment hole 25a, it elastically returns to the original condition, to elastically engage the attachment hole 25a to prevent extraction thereof. Incidentally, the engagement claw 8i projects around the entirely circumference, but it may have a structure such that the engagement claw 8*i* projects at plural portions.

A light transmission member 9A is integrated in a projecting shape at a portion covering the light emitting surface of the LED element 3 in the upper cover member 8*a*. And, in the light transmission member 9A, an inside covering the light face of the LED element 3 is a light inlet end, and an outer end is a plan light emitting end 9*a*, wherein the emitted light from the ejecting face of the LED element 3 is introduced from the light inlet end, and the light is illuminated outwardly from the light emitting end.

The above LED lighting device 1A, as one example, is combined with the hole cap or the hole plug, and improves safety, when the door is opened, by alarming a person or a car from the back to recognize an opening condition of the door by illuminating light from the LED element through the light transmission member 9*a*. In this respect, the LED lighting device 1A is the same as the Patent Document 2, but when comparing with the Patent Document 2, it can provide easily at a lower cost.

Figure 8:
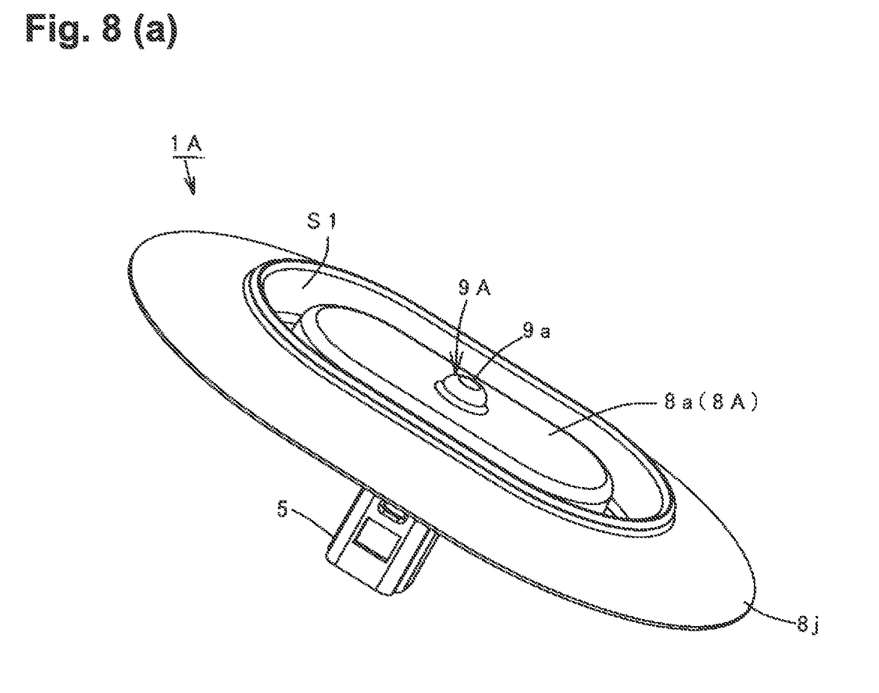
FIG. 8(a) is a schematic outside view of the LED lighting device of a second embodiment of the invention.
FIG. 8(b) is a schematic outside view of a modified example, where a shape of the second embodiment is changed.
Figure 9:
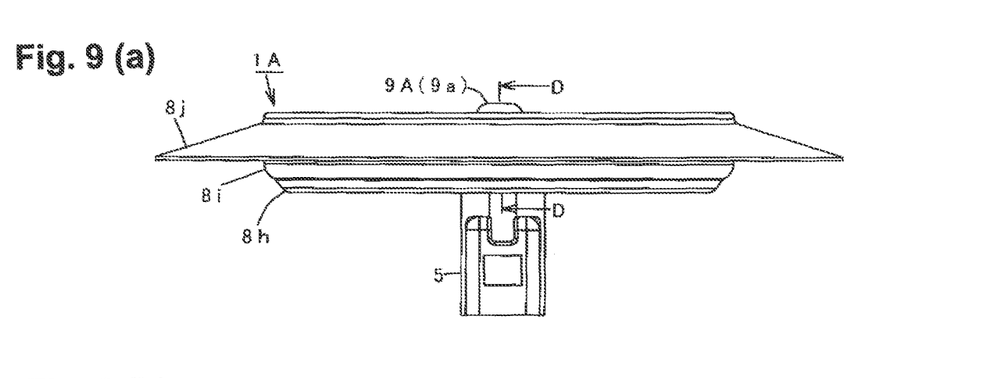
FIG. 9(a) is a schematic front view of the LED lighting device of the second embodiment shown in FIG. 8(a)
FIG. 9(b) is a schematic sectional view showing a relation between a section of the LED lighting device taken along a line D-D in FIG. 9(a) and an attached member.
FIG. 9(c) is a schematic sectional view showing a state, where the LED lighting device is engaged with the attached member.

(Modified example of the second embodiment) FIGS. 8(*b*) and 10(*a*)-10(*c*) show modified examples omitting the shape of the cover member and the connector 5 forming the LED lighting device 1A. In the explanation, members and portions same as the above embodiment are assigned with the same numerals to eliminate double explanation as much as possible.

Figure 10:
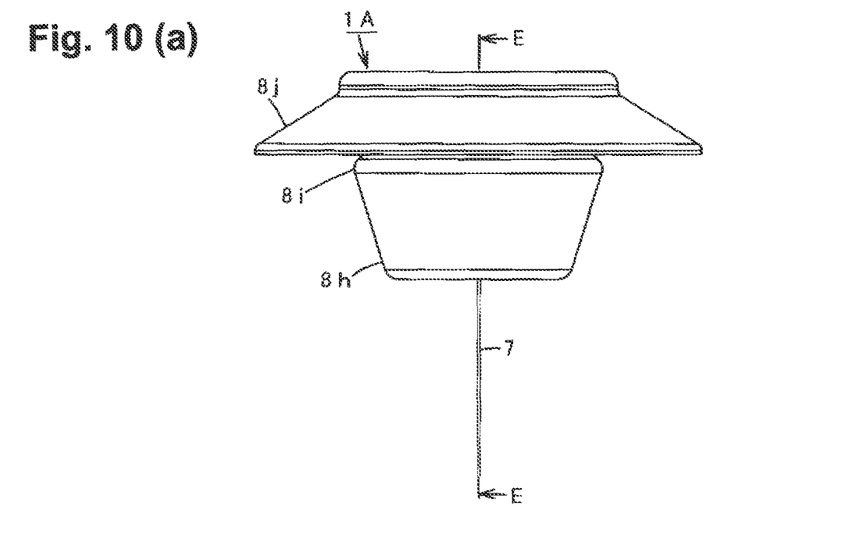
FIG. 10(a) is a schematic front view of the LED lighting device according to the modified example of the second embodiment shown in FIG. 8(b)
FIG. 10(b) is a schematic sectional view showing a relation between a section of the LED lighting device taken along an E-E line of FIG. 10(a) and an attached member.
FIG. 10(c) is a schematic sectional view showing an attached state where the LED lighting device is engaged with the attached member.

In the modified example, comparing with the LED lighting device 1A of the second embodiment, it is different in that a gap S2 between the covering portion 8A and the insertion portion 8*h* is narrow, the light emitting end 9*a* of a light transmission member 9B is not made plane and is formed to have a curved face, i.e. concave shape, and the connector 5 is omitted and so on. In these, the size of the gap S2 is designed according to the shape of the insertion portion 8*h*. When the light emitting end 9*a* is made in a concave shape or a concave lens shape, a diffusion effect of light is expected. The connector 5 may be omitted as in the present embodiment, and a cost reduction is made by omission.

Incidentally, the above invention may be sufficient with the structure defined in the claims, and further change and development in detail can be made with reference to the above embodiments and the modified embodiments. As a use of the first embodiment, an example using the LED lighting device for the energy supply port which is a power supply port of the electric vehicle is indicated, but it is not limited to this, and it may be a light for a fuel supply port as the energy injection port in a gasoline vehicle. Further, it may be a light for a trunk or vehicle interior.

For use of the second embodiment, it is not limited to the door panel of a vehicle, and it may be a hole cap or hole plug attached to or detached from an attachment hole of a vehicle panel. Also, as the LED element mounted on the substrate or the LED structure, in addition to the surface mounting type, it is possible to apply to a bullet type by modifying the head shape of the bullet type.

EXPLANATION OF NUMERALS

1 LED lighting device
1A LED lighting device (hole cap)
2 Substrate
3 LED element
4 Resistor
5 Connector
6 Insulating material
7 Power supply pins (Power supply portion)
8 Cover member
8A Cover member
8*a* Upper cover member
8*b* Side cover member
8*c* lower side cover member
8*h* Insertion portion
8*i* Engaging claw (Engaging portion)
8*j* Flange
9 Light transmission member
9A Light transmission member
9B Light transmission member
10 Case (Energy injecting portion)
11 Cylinder portion
12 Flange
13 Vertical wall
13*a* Engaging portion
14 Shaft portion
15 Groove portion
16 Frame portion
17 Transparent portion
18 Cover (19: Hinge)
20 Charging part
25 Panel (25*a*: Attachment hole)
30 Injection mole (31: Cavity)
S1 Gap
S2 Gap
SD Solder Incidentally, the entire contents of the specification, claims, drawings and abstract of Japanese Patent Application No. 2020-008489 filed on Jan. 22, 2020 are cited and incorporated herein as a disclosure of the invention.

What is claimed is:

1. An LED lighting device comprising:
a substrate; an LED element and a light emitting surface of the LED element, mounted on the substrate; a transparent cover member covering the substrate, the LED element and the light emitting surface; a light transmission member made of a transparent resin, and connected to the substrate, the light transmission member receiving emission light from the light emitting surface of the LED element at a light inlet end and operating as a light transmission path; a connector attached to the substrate on a side opposite to the LED element; and a case,
wherein the case includes an annular flange, a transparent portion having a ring shape and formed at an inner edge of the annular flange, a vertical wall projecting from a flange rear face, a groove portion having a ring shape and defined by the vertical wall, a frame portion provided on one end side of the vertical wall and formed under the flange, and a plurality of engaging portions provided at a lower end of the vertical wall, and
wherein the substrate and the LED element are disposed in the frame portion, and the light transmission member is disposed in the groove portion and engaged with the engaging portions, so that when the LED element is supplied with power, the light transmission member illuminates through the transparent portion around the annular flange.

2. An LED lighting device according to claim 1, wherein the cover member covers a periphery of the substrate, and a lower side thereof.

3. An LED lighting device according to claim 1, wherein the light transmission member is formed in an elongated shape.

4. An LED lighting device according to claim 1, wherein the light transmission member has flexibility.

5. An LED lighting device according to claim 1, wherein the cover member and the light transmission member are formed of a polyolefin type polymer.

6. An LED lighting device comprising:
a substrate; an LED element and a light emitting surface of the LED element, mounted on the substrate; a transparent cover member covering the substrate and the LED element; a light transmission member made of a transparent resin, the light transmission member receiving emission light from the light emitting surface of the LED element and ejecting from a light emitting end; and a connector attached to the substrate on a side opposite to the LED element,
wherein the cover member includes an upper cover member covering an upper side of the substrate and the LED element, a peripheral cover member covering a periphery of the substrate, a lower cover member covering a lower side of the substrate, an insertion portion having a cylindrical shape and projecting from the lower cover member, and a flange projecting from a tip of a periphery of the insertion portion and having an umbrella shape surrounding the insertion portion.

7. An LED lighting device according to claim 6, wherein the cover member further includes an engaging claw projecting outwardly from an outer periphery of the insertion portion.

* * * * *